Sept. 11, 1951 D. SAYRE 2,567,734
SIGNAL GENERATOR
Filed March 5, 1946

INVENTOR
DAVID SAYRE
BY M. O. Hayes
ATTORNEY

Patented Sept. 11, 1951

2,567,734

UNITED STATES PATENT OFFICE 2,567,734

SIGNAL GENERATOR

David Sayre, Philadelphia, Pa., assignor to the United States of America as represented by the Secretary of the Navy Application March 5, 1946, Serial No. 652,191

7 Claims. (Cl. 332—9)

1

This invention relates to electronic signal generators and more particularly to electronic signal generators capable of generating a unique amplitude modulated signal for use in testing radar systems.

To facilitate the development and testing of radar systems, it is desirable that laboratory test equipment be available to generate signals that simulate signals encountered by the radar systems in actual operation. For example, with radar equipment using an antenna system which produces a conical scan, the reflected pulses from a target on the axis of the cone will be unmodulated, whereas reflected pulses from targets falling under some other part of the illuminating beam will be amplitude modulated with a frequency equal to the speed of rotation of the conical scan. It is apparent that the amplitude of the reflected pulses may vary, as well as the percentage modulation. Therefore, to simulate the signal that returns to the radar receiver, the signal generator must be capable of generating an amplitude modulated pulse which will "see-saw" back and forth at the frequency of rotation of the conical scan, with a sharp cross-over point where there will be zero amplitude modulation. Subsidiary requirements are control of amplitude of the pulse, control of percentage modulation, and control of the cross-over point of zero amplitude modulation relative to the leading edge of the generated pulse.

The primary object of the present invention is to provide a special signal generator to facilitate laboratory testing of radar systems.

Another object of the present invention is to provide a generator capable of generating a signal having the characteristics described above.

A further object of the present invention is to provide a generator capable of generating a signal having the characteristics described above, with a minimum expenditure of electron tubes and circuit elements.

The foregoing and other objects of this invention will be apparent from the following detailed description when taken with the following drawings in which.

Figure 1:
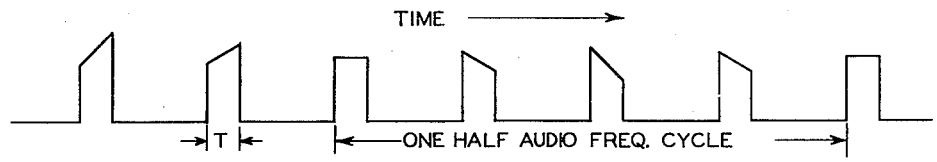
Fig. 1 shows the desired output wave form of the signal generator.

Referring to the drawing, and more particularly to Fig. 1, the wave form indicates the required output of the signal generator. Each pulse consists of a pedestal voltage plus a modulating voltage which changes the shape of the top of each subsequent pulse. It can be seen that the top of the pulses "see-saw" when taken over a period of time which is large compared to the period of the pulse, T. The rate of see-saw can be controlled at some audio frequency. The generation of such a signal is hereinafter described.

Figure 2:
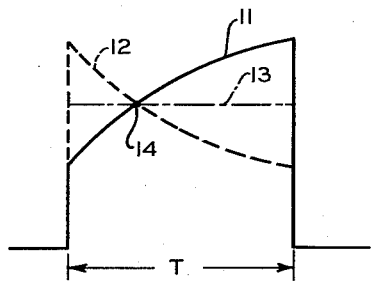
Fig. 2 is an enlarged view of an individual video pulse taken from the series of pulses of Fig. 1.

Fig. 2 is an enlarged picture of a single pulse to illustrate more clearly the operation of the "see-saw" modulation. At some instant of time the video pulse is of the form shown by curve 11, with the top sloping upward to the right. At a time later, corresponding to a half-period of the controlling audio frequency, the pulse takes the shape of dotted curve 12, with the top sloping downward to the right. At some intermediate time the wave form may have a flat top as illustrated by curve 13. Cross-over point 14 is fixed with relation to the rest of the pulse, hence the name "see-saw." It is apparent that at point 14 there results zero amplitude modulation. With a suitable method of control, cross-over point 14 may be shifted to any desired position relative to the start of the pulse.

Figure 3:
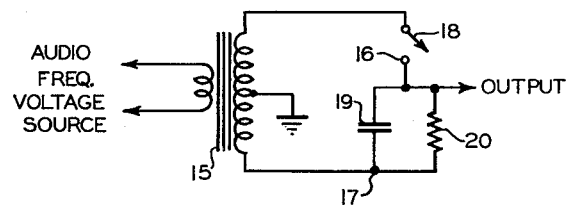
Fig. 3 is a diagram of an elementary circuit which will theoretically generate the desired "see-saw" modulation for the pulse of Fig. 2.

The circuit shown in Fig. 3 illustrates theoretically how the desired "see-saw" modulation can be generated. An audio voltage of the same frequency as the desired "see-saw" modulation frequency is applied to the primary of audio frequency transformer 15. By grounding the center tap of the secondary the voltage at point 16 is 180 degrees out of phase with the voltage at point 17. With switch 18 closed, which is normally the case, the output will be simply a sine wave. If, however, at an instant when switch 18 is opened point 16 is at a maximum positive value then point 17 will be at a maximum negative value of the impressed sine wave voltage and a voltage difference results across the resistance-capacitance circuit consisting of condenser 19 and resistor 20. During the time T, when switch 18 is open, this difference in voltage causes the voltage at point 16 to adjust itself to the voltage at point 17, and the output is an exponential curve with a time constant substantially equal to RC, such as curve 12 in Fig. 2. It is conceivable that switch 18 may be opened at any time corresponding to any point on the impressed sine wave voltage which results in difference potentials across the RC combination of varying magnitudes and direction, which explains the possibility of getting either of curves 11, 12 or 13, or any other exponential between the limits of curves 11 and 12. The foregoing discussion has not described the generation of the pedestal voltage, but makes provision only for the generation of the modulating signal.

Figure 4:
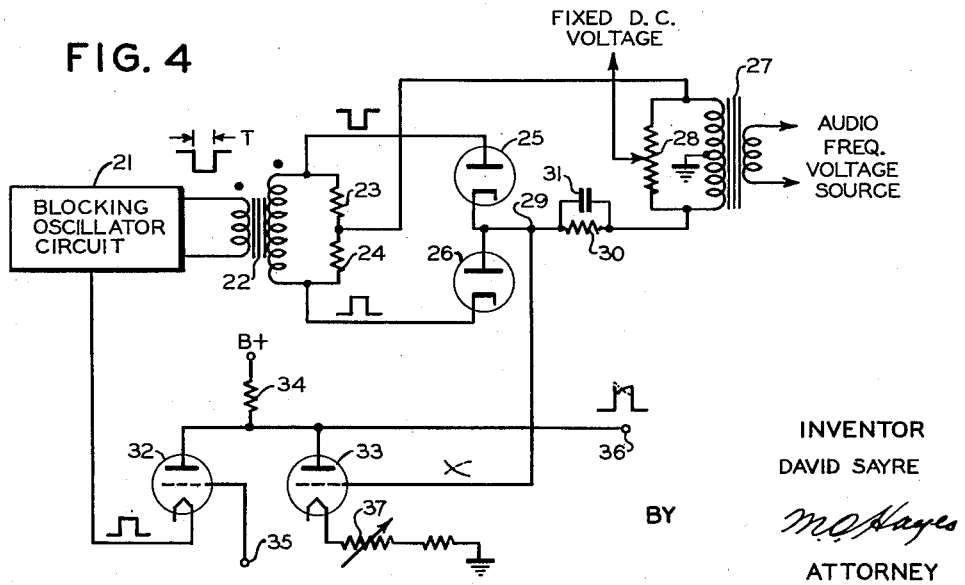
Fig. 4 is a schematic diagram of a practical circuit which will produce the desired "see-saw" modulated video signal.

To put the elementary circuit of Fig. 3 into a practical circuit, some method must be provided for applying the modulating voltage to a pedestal voltage. Also, since a mechanical switch is too slow for the present application, switch 18 is replaced by a diode double-clamp circuit. Referring to Fig. 4, blocking oscillator circuit 21 generates a pulse which is applied to pulse transformer 22. Since the center tap of most pulse transformers is not accurately located, resistors 23 and 24 are selected to result in such voltage division across the secondary of transformer 22 that the pulse on the plate of diode 25 will be equal in amplitude to that on the cathode of diode 26. An audio frequency voltage of the desired modulating frequency is impressed on the primary of transformer 27. Potentiometer 28 is connected across the secondary, with its movable arm connected to a fixed D. C. voltage, to provide a method of varying the position of the cross-over point, as previously mentioned. When no pulses are coming through pulse transformer 22, diodes 25 and 26 are both conducting which corresponds to switch 18 of Fig. 3 being closed. When a pulse is introduced diodes 25 and 26 are made non-conducting which corresponds to the opening switch 18 for the duration of the pulse, T. The output signal at point 29 will be a series of exponential curves similar to those generated by the elementary circuit of Fig. 3, as explained above, by the action of the RC circuit consisting of resistor 30 and condenser 31.

To combine the modulating signal with a pedestal voltage a mixer circuit consisting of triodes 32 and 33 having common load resistance 34 is employed. Triode 32 is so biased by a negative voltage applied at terminal 35 of such value that it is conducting heavily when there is no pulse on the cathode. Triode 33 is so biased that it has little control on the common plate voltage when triode 31 is conducting heavily. However, when a positive pulse is applied to the cathode of triode 32, the current through the tube is cut off, the common plate voltage increases and triode 33 gains control of the current through load resistor 34. The pulse applied to the cathode of triode 32 is of the same duration and synchronized with the pulse applied to transformer 22, resulting in the exponential signal, explained above, appearing on the grid of triode 33 at the same time that its plate voltage increases. The signals are thus mixed in proper time relation, and the desired signal appears at terminal 36. Potentiometer 37 changes the bias on triode 33, resulting in a control of modulation amplitude. Any suitable method, familiar to those skilled in the art, may be employed to control the pedestal amplitude.

The foregoing discussion describes the invention in its application to the generation of a specific video signal. It is conceivable that the "see-saw" modulating signal could be utilized in other connections as well, but the scope of the invention is defined by the appended claims.

What is claimed is:

1. A signal generator comprising a grounded center-tap audio frequency transformer, switching means, a parallel resistance-capacitance combination in series with said switching means connected across the secondary of said transformer, said switching means capable of being opened for a short time relative to the period of the audio frequency voltage impressed on the primary of said transformer, the output voltage at a point between said switching means and said resistance-capacitance combination during the time said switching means is opened following an exponential curve which has a time constant substantially equal to the product of the resistance and the capacitance of said resistance-capacitance combination.

2. A signal generator for the production of periodically recurring sweep voltages of cyclically varying amplitude and slope comprising an audio frequency transformer having a grounded center tap on the secondary winding, two electron tubes having at least a cathode and a plate so biased as to be normally conducting, a parallel resistance capacitance circuit, said resistance-capacitance circuit and said electron tubes being connected in series across said secondary of said transformer, and a free-running blocking oscillator, the pulse output of said blocking oscillator periodically cutting off said electron tubes for short time intervals relative to the period of the audio frequency voltage impressed on the primary of said transformer, the output voltage obtained at a point between said resistance-capacitance circuit and said electron tube during the cut off time of said electron tube following an exponential curve having a time constant which is substantially determined by said resistance-capacitance circuit.

3. A signal generator for the production of periodically recurring sweep voltages of cyclically varying amplitude and slope comprising an audio frequency transformer having a potentiometer connected across the secondary winding of said transformer with the movable contact of said potentiometer connected to a fixed source of direct current voltage, two normally conducting diode electron tubes connected together plate to cathode, remaining plate and cathode connected across the terminals of a pulse transformer, a parallel resistance capacitance circuit, said resistance capacitance circuit connected in seres with the secondary of said audio frequency transformer between the joined plate and cathode of said diode electron tubes and the center-tap of said pulse transformer, and a free running blocking oscillator, the pulse output of said blocking oscillator cutting off said diode electron tubes for short time intervals, relative to the period of the audio frequency voltage impressed on the primary winding of said audio frequency transformer, the output voltage obtained at the joined plate and cathode of said diode electron tubes during the cut-off time of said electron tubes following an exponential curve having a time constant which is substantially determined by said resistance capacitance circuit.

4. The signal generator of claim 3 in combination with a mixer circuit for the production of periodically recurring amplitude modulated video pulses, said mixer-circuit comprising first and second electron tubes each having at least a cathode, a plate, and a control grid, said first and second electron tubes having common plate load resistance, said first electron tube so biased as to be normally heavily conducting, the pulse output of said free-running blocking oscillator applied to said first electron tube, and the output of said signal generator simultaneously applied to said second electron tube, the output signal at the junction point of the plates of said first and second electron tubes being an addition of the pulse output from said blocking oscillator and the sweep voltage output of said signal generator.

5. Apparatus for providing voltage pulses of cyclically varying amplitude and slope comprising, a pulse generator, a source of audio frequency oscillatory voltages, and means for mixing the outputs of said pulse generator and said audio frequency source for causing the output pulses of said pulse generator to assume exponentially varying forms.

6. A signal generator for providing voltage pulses having cyclically varying slopes and amplitudes comprising, a pulse generator, an audio frequency oscillator, a parallel circuit of resistance and capacity, switching means for alternately connecting and disconnecting said oscillator and said circuit of resistance and capacity, and means for mixing the output of said pulse generator with the output of said circuit of resistance and capacity in response to the disconnecting action of said switching means.

7. A signal generator for providing voltage pulses having cyclically varying slopes and amplitudes comprising, a blocking oscillator, an audio frequency oscillator, a grounded center-tap audio frequency transformer having its primary coil energized by said audio frequency oscillator, a switching device and a parallel circuit of resistance and capacity serially connected across the secondary coil of said audio frequency transformer, and a mixing circuit for selectively combining the output voltages of said blocking oscillator and said parallel circuit to provide voltage pulses of predetermined shapes.

DAVID SAYRE.

REFERENCES CITED

The following references are of record in the file of this patent:

UNITED STATES PATENTS

| Number | Name | Date |
|---|---|---|
| 2,379,899 | Hansell | July 10, 1945 |
| 2,405,552 | Blumlein et al. | Aug. 13, 1946 |